United States Patent [19]

Armanet et al.

[11] Patent Number: 4,665,158
[45] Date of Patent: May 12, 1987

[54] METHOD FOR HYDROLYZING PROTEIN MATERIALS

[75] Inventors: Jean-Michel Armanet, Onex; Claude Giddey, Geneva, both of Switzerland; Jean-Pierre Sachetto, Saint-Julien-en-Genevois, France

[73] Assignee: Battelle Memorial Institute, Geneva, Switzerland

[21] Appl. No.: 739,236

[22] Filed: May 30, 1985

[30] Foreign Application Priority Data

Jun. 13, 1984 [CH] Switzerland ..................... 2859/84

[51] Int. Cl.$^4$ ............................................. A23J 3/00
[52] U.S. Cl. .................................... 530/357; 530/370;
530/371; 530/377; 530/407; 530/824; 530/825;
530/857; 530/859; 426/656; 426/657; 426/318
[58] Field of Search ...................... 426/656, 657, 318;
260/112 R, 123.5, 123.7; 530/343, 350, 357,
370, 407, 371, 377

[56] References Cited

U.S. PATENT DOCUMENTS 4,130,555 12/1978 Ohtsuka et al. ................. 426/657 X
4,172,073 10/1979 Kadri et al. ...................... 426/657 X
4,291,063  9/1981 Ridgway ......................... 426/656 X
4,545,933 10/1985 Ernster ........................... 426/657 X

FOREIGN PATENT DOCUMENTS 673203  6/1939  Fed. Rep. of Germany .

OTHER PUBLICATIONS

Bird, E. J., et al, "Low Temperature Hydrolysis of Commercial Proteins", Food Ind., vol. p. 216, Feb. 1948, pp. 118–120.

Primary Examiner—Robert Yoncoskie
Attorney, Agent, or Firm—Cushman, Darby & Cushman

[57] ABSTRACT

Dehydrated protein materials are treated with gaseous HCl without temperature control, the reaction temperature being susceptible to reach, momentarily, 150° C. Then the material thus treated is degassed and, after drying, a non hygroscopic powder usable in the food industry or in the pharmaceutical industry is obtained.

12 Claims, No Drawings

METHOD FOR HYDROLYZING PROTEIN MATERIALS

The present invention concerns a method for the acid hydrolysis of protein materials of animal or vegetable origin.

It is known that by the hydrolysis of protein materials such as, for instance, meat refuses, fish refuses, animal fibers such as silk, horse hair and furs, the cakes of oilseeds such as peanut, soja, cotton and others, casein, bacterial and yeast proteins, etc.. it is possible to obtain interesting industrial products such as amino-acids and oligopeptides. Such products are useful in the pharmaceutical industry (drugs) and in the food industry (animal forages and human food).

In order to effect such a hydrolysis, mineral acids in concentrated aqueous solutions are generally used, namely hydrochloric acid whose advantages towards other acids are mainly due to its relatively lost cost and to the fact that, by neutralization, it gives ordinary salt which is acceptable in food products (see Industrie Alimentari (1978) 17 (4), 285–288). However, when aqueous hydrochloric acid is used for hydrolyzing protein matters, it is thereafter necessary, in order to obtain relatively concentrated hydrolysates, to subsequently evaporate a large proportion of this aqeous acid which step, obviously, is unfavorable on an energetic point of view.

Moreover, the use of aqueous acid only leads, even with reaction times of 10 to 20 hours at the boil, to limited hydrolysis levels. Thus, in British patent GB-A-No. 1,494,856, it is indicated that the amino nitrogen percent relative to the total of the nitrogen of the protein hydrolysate, the latter having been subjected to a hydrolysis by means of about 1.7 moles of hydrochloric acid at 37%, is of 67%.

To remedy the aforementioned drawbacks, one has recently proposed to replace the aqueous hydrochloric solution by hydrochloric gas. Thus, document EP-A-No. 25580 (BASF) discloses a process according to which one subjects a protein material priorly dried to a moisture level below 20%, to treatment by gaseous HCl at a temperature not exceeding 50° C. which provides a protein material HCl addition product. The subsequent addition of water or other hydrolyzing solutions to that addition product enables the latter to get progressively transformed, with or without heating, into a protein hydrolysate and into amino-acids. Besides, according to a variant of this method of the prior art, it is also possible to simultaneously add the hydrochloric gas and water vapor which enables to directly obtain a hydrolysate.

Despite undisputed advantages over prior methods, this recent process is still plagued with some shortcomings which should be desirably removed, namely the requirement to first dry relatively thoroughly (<20%), the protein material to be treated and that to control the temperature during the addition of the gaseous acid by an appropriate cooling device. Yet, it is known that it is in general not easy to maintain the temperature of a material which is often bulky and flaky below certain limits when it is the center of an exothermal reaction and when it enables only limited thermal contact with the walls of the container.

The present method remedies appropriately these drawbacks. Indeed, to achieve the claimed operating conditions, it is generally not necessary to provide a cooling device for the reaction mass and, besides, most of the commercially available protein materials which can be converted into protein hydrolysates have a natural moisture level which exceeds 20% by weight which enables to directly use them without prior treatment or after a simplified drying operation, for instance by draining or by drying in air.

It will be also remarked that the present method also has the advantage, compared to the prior technique, to directly furnish a hydrosoluble product without further treatment. Now, this was not the case with regard to the older HCl protein addition product disclosed in document EP-A-No. 25580, this product requiring, to further provide a hydrosoluble protein hydrolysate, to be kneaded with water, a diluted acid or a diluted alcali and the dough thus achieved having to be heated between 60° and 95° C. to be transformed into an aqueous solution. The process of the invention has therefore the advantages of simplicity and economy of energy compared to the prior technique; it is not expensive and provides protein hydrosylates of excellent quality usable, in many cases, without further treatment.

Finally, the present process only requires relatively small quantities of HCl, more particularly when the protein to be hydrolyzed is relatively dry, for instance when it contains no more than about 20 to 30% humidity. Indeed, it is evident that in the case of very moist protein materials, it is necessary to add a quantity of dry HCl larger than when dealing with a material with less humidity in order that the strength of the aqueous acid solution which results from the dissolution of the gaseous HCl in the water contained in the material to be hydrolyzed will reach an efficient value. It will be noted in this respect the existence of an older document (DE-C-No. 673.203) which discloses the treatment of protein materials (Keratin) by gaseous HCl, these materials having been priorly wetted with water up to a relatively high humidity level (80% or more). In such circumstances, the addition of hydrochloric gas (in the conditions of temperature control disclosed in this document) does not lead to an extensive hydrolysis of the protein mass—indeed the latter, at the end of the treatment, is water insoluble—but actually to the selective rupture of some peptidic bonds (see Col. 2, lines 26 to 34). In the present invention, in contrast, provision is made that a proportion as large as possible of the starting protein materials becomes hydrosoluble, i.e. practically the totality.

An additional advantage of the present invention is constituted by the possibility, after the treatment with gaseous HCl has been achieved (the added quantity of the latter being in this case at least 1 theoretical equivalent relative to the amino-acids, that is to say about 30% by weight of HCl by weight of dry proteins) and without having to further add water or other additional reagents, to subject the liquefied mass which results from this hydrolysis to a heating operation in an autoclave, this operation leading to a complete liberation of the amino acids from the polypeptides of the starting material with a practically quantitative yield.

In order to practically implement the method of the present invention, it is for instance possible to introduce the material to be hydrolyzed into a glass flask (in the laboratory) or into a reactor made of a material which resists to acids, for instance special corrosion resistant steel, vitrified steel, pyrex, ceramic materials, plastics, and, in this reactor, for instance at its lower part, gaseous HCl is introduced at a rate sufficient for ensuring that the reaction temperature, at the moment when the HCl is impregnated in the organic mass, increases rapidly and exceeds 50° C. Thus, as a general rule, it is not necessary to provide a cooling of the reactor although, naturally, the existence of a cooling device is in no way forbidden. Indeed, it is preferable that the reaction temperature does not exceed certain limits, for instance 150° C. or, better, 110° C. and if, for moderating this temperature, nothing is done on the rate of flow of the HCl, it is possible to use a cooling device, for instance a water circulation mantle. It will be noted in this connection that in the present method, the reaction proceeds often with partial or total liquefying of the mass under treatment, such a change of conditions widening considerably the thermal contact areas between the mass under treatment and the walls of the reactor and therefore increasing the efficiency of the cooling system, if any.

As starting materials of animal or vegetal origin which suit the embodying of the invention, one can recite, on one hand the natural products of essentially protein origins and on the other hand, those which contain, besides proteins, non-protein organic materials such as carbohydrates, fats, minerals and others. In the first of these categories, one can more particularly recite meat refuses, dried blood, fish offals, microbial proteins, yeasts, feathers, hairs, horse hair, hair, nails, ground horn and others. In the second category, one can recite milk proteins (skimmed milk, casein) and oilseed cakes such as peanut, sunflower, soja, cotton, corn, etc. Preferably, the protein content of the material to be treated should exceed 40% by weight; it is advantageously comprised between 50 and 100%.

Preferably, to ensure a good contact between the gaseous HCl and the material to be hydrolized, the latter will be used in comminuted form and, if it is not so naturally, it will be reduced to flakes or to powder by crushing, milling or other mechanical work. If the material is provided as a very fine powder, it can be advantageous to granulate it into particles of dimensions of the order of 100 $\mu$m to 5 mm for instance, so as to avoid, in the case of a static treatment (that is to say when the material subjected to the flow of HCl is not agitated mechanically), the formation of gas passages within the mass (fissuration of the mass), part of the mass remaining therefore unreacted. Such a granulation can be achieved by usual means known from men in the art for instance with a rotating cylinder in the presence of a granulation agent such as urea or a polysaccharide.

When the material to be hydrolized has been impregnated with HCl (the weight ratio of the HCl to the protein material to be hydrolized being comprised preferably between 0.2:1 and 1:1 but susceptible to remain behind or to exceed such limits in special cases, for instance if a mass is lean in protein materials), it is possible to maintain it during a period of the order of ¼ hour to several hours (for instance 5-6 hours) with or without agitation at a temperature of the order of 50° to 120° C. so as to complete the hydrolysis. These conditions are however not critical because they depend, not only on the nature of the material to be treated, but also on the degree of hydrolysis which is desired.

Indeed, it is evident that the degree of hydrolysis will depend, on one hand on the strength of the acid which impregnates the mass to be hydrolyzed and, therefore, on the weight of the latter relative to the material to be hydrolyzed and relative to the quantity of initial moisture of the latter, but on the other hand also on the hydrolysis conditions (temperature and reaction time); the more these conditions are, the more extended is the degree of hydrolysis.

When the materials to be hydrolyzed contain a marked proportion of non-protein components (in the case for instance of the oilseed cakes), the latter undergo in general also a decomposition which is more or less pronounced. The polysaccharides, for instance, can be hydrolyzed into oligosaccharides which are more or less hydrosoluble, or into sugars. In many cases, strongly coloured degradation products are formed of which part is insoluble in water and can be retained by filtration, and another part comprises hydrosoluble products dissolved in the filtrate which accompany the protein hydrolysate and which in certain cases, contribute to improve the properties thereof (for instance the organoleptic properties in the case of hydrolysates used as food products). In other cases, these hydrosolubles degradation products are eliminated by filtration on charcoal when they are not desirable.

When the material to be hydrolized has been impregnated with HCl as described above and left to rest at a selected temperature until the desired degree of hydrolysis is obtained, it is possible to degas it and to eliminate the excess of liquid. Naturally, the possibility of such degassing needs to be considered only if the amount of HCl used exceeds that which remains normally fixed under the form of hydrochlorides of the amine functions liberated by the hydrolysis. For this, the reaction product is subjected to a reduced pressure and it is heated so that a notable proportion of HCl is evaporated in the form of gas, the latter being recyclable in the process. This technique constitutes one of the additional advantages of the invention, because it enables to recover most of the HCl used which exceeds that which is retained in the mass under the form of the hydrochorides which renders the process very economical. When the available gaseous proportion of HCl has been eliminated, it is possible to continue the evaporation of the aqueous phase (which will the distil in the form of aqueous hydrochloric acid at about 20–25%) up to dryness, the residue becoming (for instance in the case of the hydrolysis of essentially proteinic materials) a dry powder, not hydroscopic, stable in air, soluble in water and without acidic odour. This powder contains HCl probably bound in the form of hydrochlorides with the amine groups of the oligomers and amino-acids liberated by hydrolysis. At this stage, it is then possible to convert this bound HCl into salt by dissolution of the powder into water (which provides an acidic solution) then addition of sodium hydroxide up to neutrality which provides a salty solution of oligopeptides and other amino-acids. Such a solution can be directly used for making food because it only contains, in general, a relatively small proportion of salt compared with the corresponding extracts obtained by conventional routes. Indeed, due to the small quantity of water taking part in the invention, the residual acid level of the hydrolysates which are provided is quite below that of the corresponding hydrolates of the prior art technique which result from the use of concentrated liquid acid; thus, consequently, the saltiness of the neutralized hydrolysates obtained according to the invention is reduced relative to the corresponding known products. Thus, for instance, in the prior art (see the aforementioned references) one commonly uses one part of 32% hydrochloric acid for one part of dry materials containing about 50% of protein. By the reduced pressure degassing (50°/20 Torr) it possible to decrease the acid content beyond that of the azeotropic solution which normally forms in such conditions, that is 20% solution. For 100 g of 32% acid (32 g of HCl+68 g of water), one will therefore still have (assuming that the acid is not fixed otherwise) 18 g of HCl (18/(68+18)=21). In the present invention, when one uses a protein material containing for instance 30% humidity, that is 43 g for 100 g of dry material, the same degassing operation leads to a theoretical residual HCl content of a maximum of 11.4 g, that is an economy of 6,6 g ( more than 30%).

According to an embodiment modification of the method of the invention, it is possible to effect the conversion of the starting material into protein hydrolysates by operating continuously. It is possible for instance for this to use a reactor of general cylindrical form equipped with an internal mechanism the function of which is to axially displace the material to be treated from one of the ends of the cylinder (input through which said material is introduced) towards the other end (output). This device comprises a screw like element integral with a hollow longitudinal axis whose rotation induces the progressive displacement of the mass to be hydrolized. This hollow element is perforated and the gaseous HCl which circulates inside along the axis is ejected through the perforations and penetrates therefore regularly into the mass under displacement which contracts and even liquifies progressively as it advances in the reactor. The material which is thus treated is evacuated at the outlet of the reactor, either by gravitation if the fluidity of the material is sufficient, or by means of another conveyor-screw, and it is introduced into a degassing enclosure where, under reduced pressure, most of the gaseous HCl is evaporated and sent back into the axial tube of the reactor to be recycled. The degassed mass is thereafter transported into a drying chamber where the remainder of the aqueous acid is driven off, either by distillation, or by spraying the solution in an inert hot gas, for instance air. The description of an apparatus suitable for the above processes is disclosed in document EP-A-81201182.

The protein hydrolysates obtained according to the present procedure can be used in a dry form or in aqueous solution, as such or after subsequent treatments. As such, they may be employed for all common uses for which the protein hydrolysates of the prior art are suitable, for instance for feeding animals or mankind: products for flavouring forages, yeast extracts, preparation of broths for sauces, soups and vegetables and other similar uses.

In the field of the pharmaceutical industry, the hydrolysates can be subjected to purification processes in order to separate some oligomeric fractions which are more specific or certain amino acids in pure form. The oligopeptides can also be split into lower molecular weight fragments by usual means, included fermentations and other biochemical techniques. The purification and isolation methods for certain specific compound used are conventional and comprise column chromatography, sephadex chromatography, electrophoresis, isoelectric focusing, etc. . . .

As it has already been previously noted, the present process has a further considerable advantage over the older techniques, this advantage being related to the possibility (and this is actually a complement to the carrying out of this invention) to enable the direct conversion of the reaction product into amino acids, this being nearly quantitative. Indeed, it is sufficient for effecting this transformation that the quantity of HCl put into play be of at least 1 mole per mole of amino acids (the average molecular weight of these amino acids when they issue from protein materials such as horn, hair and feathers being of the order of 120 D). Thus, in general, when the quantity of HCl used in the present process is at least 30% by weight (36.6 g for 120 g of protein considered pure at 100%), the reaction product can be subjected without adding any additional reagent, to a pressurized heat treatment of relatively short duration so that the amino acids still bound in the form of oligopeptides be entirely set free. The conditions of such treatment can be identical with that taken from the literature which concerns the quantitative analysis of proteins in a large excess of aqeous hydrochloric acid, for instance heating 1-2 hours at 170°-180° C. under pressure. However, milder conditions coupled with longer reaction times are also applicable, for instance several hours of heating under pressure at a temperature above 100° C., for instance between 120° and 170° C.

This technique is therefore easily applicable to the treatment of protein hydrolysates issued from the process of the invention when carried out continuously, these hydrolysates being in liquid form, they can be simply pumped out at the outlet of the reactor and introduced as such into an autoclave in which their transformation into amino-acids will be achieved practically quantitatively.

The examples that follow illustrate the invention in a more detailed manner.

EXAMPLE 1

In a tubular column having 3,14 cm² cross-section area and a length of 20 cm made of pyrex (of a type having a water circulation mantle), where placed 14,27 g of "semi-peanut" meal granules about 0.5 m containing 25% by weight of moisture (10.27 g of dry materials and 3.57 g of water). The protein content of this meal was 52% by weight, the 48% that remains being constituted of cellulosic fibres, fatty materials, mineral matter, starch and non-characterized residues.

Dry gaseous hydrochloric wsas circulated from bottom to top of the column at a rate such that, in 20 min, 3.07 g of HCl had been absorbed. The material which had then contracted and became coloured by partial liquefaction was thereafter cooled by circulating water at 10° C. in the cooling mantle and there was further 0.4 g of gaseous HCl. Then, under ordinary pressure, heat was applied for 1 hour at 45° C. which causes the removal of 0.96 g of HCl. The pressure was thereafter reduced to 20 Torr by means of a water pump and a degassing evaporation operation was carried out at 45°-50° C. which caused the removal of 3.82 g of water and HCl, providing therefore 12.85 g of a dry powder, not hygroscopic and of deep colour. This powder was taken again into 38 ml of water where it dissolved at about 60%. After filtration (weight of the dried residue 4,28 g) this solution was neutralized to pH 7 with normal sodium hydroxide (8.36 ml of NaOH N/10 were used).

The odour and the taste of the product thus obtained being satisfactory, and its level of salinity being only 3–3,5%, it was used directly as a flavouring ingredient for the manufacture of instant soups.

EXAMPLE 2

Chicken feathers were drained until their humidity was 60-65% by weight and 27.44 g of these feathers were introduced into the column of the prevous example. Thereafter, gaseous HCl was circulated for 45 min from bottom to top of the column, so that the temperature would reach 103° C. after several minutes and would slowly decrease down to 45° C. after 30 minutes. The material having absorbed 13.21 g of HCl was converted into a red homogeneous liquid which was evaporated for 1.5 hours at 75° C. under 20 Torr. There was obtained 11.43 g of a dark powder which dissolved practically entirely in 60 ml of water at 40° C. (filtration residue 0,22 g). The acidity of this solution was neutralized to pH 7 with normal sodium hydroxide, this acidity corresponding to the presence of 1.78 g of HCl.

EXAMPLE 3

In a tubular reactor of 1.5 l in pyrex provided with a stirrer were placed 368 g of chicken feathers (14.9% of total nitrogen) with about 60% humidity (147 g of dry materials). Dry HCl was circulated during 30 min from bottom to top of the reactor at the rate of 4-5 l/min. A rapid temperature rise up to 100° was observed after a few minutes, then a progressive drop down to about 60° C. There were thus obtained 522 g of a deep red liquid (amount of absorbed HCl 154.2 g) which was placed in a rotavapor apparatus and evaporated for 2.5 hours at 60°-65° C./20 Torr. There were thus obtained 118.7 g of odourless brown powder and 333 g of hydrochloric acid solution at 25% was recovered. After extended drying of the powder (110°/$P_2O_5$), one has obtained 117 g of material of which the residual humidity level was about 0.5% (Karl Fischer). By analysis, this dry powder was measured to have a total nitrogen content of 18.8% and a nitrogen content in form of free amines of 4,12%.

15 g of this powder were dissolved in 150 ml of water (measured pH 1.7), the solution was filtered and 50 ml thereof were neutralized by N/10 NaOH at pH 5.8. At this pH, the bound HCl is entirely transformed into NaCl, the amount of added sodium hydroxide necessary to increase the pH to 7 corresponding to the salification of the carboxylic groups of the amino acids and oligopeptides present in the solution. Such a neutralisation by NaOH corresponds to a salt level by weight in the dry product of about 17%.

EXAMPLE 4

228 g of chicken feathers at 44% humidity (128 g of dry matter and 100.5 g of water) were treated with 89.2 g of gaseous HCl in 2 hours under the same conditions as in the previous example and there were obtained 317 g of a viscous liquid (temperature rise to 100° C. after 10 min, then progressive drop). After 2 hours of stirring at ambient pressure and under 50° C., the mass was heated 2,5 hours at 65°-70° C./20 Torr which caused a weight loss (elimination of HCl and water) of 139 g. There was thus obtained a reddish powder, 136 g after drying at 110° C. on $P_2O_5$. This powder analyzed for 20,11% of acid (calculated as HCl) by neutralisation with sodium hydroxide at pH 7. By analysis, the effective level of HCl was 13.18%, the difference arising from the neutralisation of the COOH group of the amino acids. Total nitrogen 12.66%; nitrogen of the free $NH_2$ groups 3.73%.

EXAMPLE 5

Humid chicken feathers were drained in a centrifuge so as to remove the water deposited on their surface. By this technique, feathers whose water content was 25% by weight were obtained.

0.467 kg of these feathers (0.35 kg of dry product) were treated in a rotating flask (ROTAVAPOR) of 5 l by HCl introduced at a rate sufficient to cause the temperature to rise to 90°-100° C. in 3½ min. At this stage, there was noted a change of state (contraction) and of colour (turning to red). After 1 hour, the addition was stopped; the mass had transformed into a thick liquid having absorbed 145 g (1.36 equivalent) of HCl. By analysis, it was noted that 56% of the theoritical amount of acid stayed bound in the mass.

The liquid was transferred into an autoclave which was rinsed with nitrogen, after which it was heated for 2 hours at 180° C. The residue was taken in 1 l of distilled water, the insoluble substances were filtered off, then an aliquot was taken which was analyzed in terms of concentration of dissolved solids and amino acids (HPLC analysis=high performance liquid chromatography) results being expressed as o/oo by weight relative to these solids as if in the form of dry matter. It was found that the yield of dissolved solids was of the order of 90% of the starting material, the analysis of the aminoacids being gathered in the table below.

Comparative experiment

For comparison purposes with the state of the art, 10 g of the feathers of example 5 (7.5 g dry) were treated in an autoclave by 12 g of 25% HCl (2.88 g of dry HCl, 1.26 equivalent) for 2 hours at 180° C. Then, as above, the analysis of the free amino acids was effected, the results being also expresed in o/oo of the weight of the starting material. The results are gathered in the table below.

| | Analysis of the amino-acids (% by weight) | |
|---|---|---|
| Amino-acid | Example 5 | Comparative Example |
| Asp | 53.6 | 15.26 |
| Glu | 82.2 | 32.86 |
| Ser | 68.6 | 3.24 |
| His | 4.5 | 1.31 |
| Gly | 54.1 | 20.13 |
| Thr | 36.0 | 7.40 |
| Arg | 53.4 | 5.23 |
| Ala | 31.8 | 43.30 |
| Tyr | 19.8 | 3.98 |
| Met | 2.9 | 1.30 |
| Val | 64.9 | 33.7 |
| Ph. Al | 36.7 | 16.4 |
| Ileu | 40.9 | 18.6 |
| Leu | 62 | 27.9 |
| Lys | 19 | 3.25 |
| Cys | 71.3 | — |

It can be seen, from the above results, by using a quantity of acids practically equivalent to that of the experiment effected under the conditions of the invention (Example 5) but in the form of a aqueous solution (comparative example), that the yield in amino acids is only quite small, the extent of hydrolysis being, quite evidently, very inferior.

We claim:
1. In a process for hydrolyzing protein material of animal or vegetable origin by means of gaseous hydrochloric acid so as to convert the protein material into a water-soluble mass, the improvement which comprises providing protein material which has a moisture content in excess of 20% by weight, adding gaseous HCl to said material under atmospheric pressure at a rate such that the temperature of the resulting mixture exceeds 50° C. and allowing said mixture to react until a water-soluble mass is obtained.

2. Process according to claim 1, wherein the weight of HCl used relative to the dry protein material is 20 to 100%.

3. Process according to claim 1, wherein the moisture content of the material to be treated is 20 to 80% by weight.

4. Process according to claim 1, wherein the maximum reaction temperature is 150° C.

5. Process according to claim 1, wherein the material to be treated is particulate and has a particle size of 100 μm to 5 mm.

6. Process according to claim 1, wherein the protein content of the material to be treated is above 40% by weight.

7. Process according to claim 1, wherein the material to be hydrolyzed is selected from the group consisting of meat refuses, fish meals, bacteria and yeast proteins, residues from waste waters, milk proteins, keratin proteins and vegetal proteins.

8. Process according to claim 1, wherein the hydrolysis mass is degassed by evaporating excess HCl and the thus recovered HCl is recycled for further use.

9. Process according to claim 8 wherein, after degassing, the hydrolyzed material is dried to remove all the HCl not chemically bound thereto.

10. Process according to claim 9, including the step of dissolving the dried material in water and neutralizing the bound HCl by treating the dissolved material with sodium hydroxide up to a pH of 5.5 to 7, the thus neutralized product being compatible for use in or as food.

11. Process according to claim 1, which includes the step of heating the mass, after addition of the HCl, in an autoclave under pressure at a temperature above 100° C. to substantially completely hydrolyze the material into amino acids.

12. Process according to claim 11 wherein the material is heated for 2 hours between 160° and 200° C.

* * * * *